S. & W. H. WITHEROW.
Seed Planter.
No. 9,551.
Patented Jan. 18, 1853.
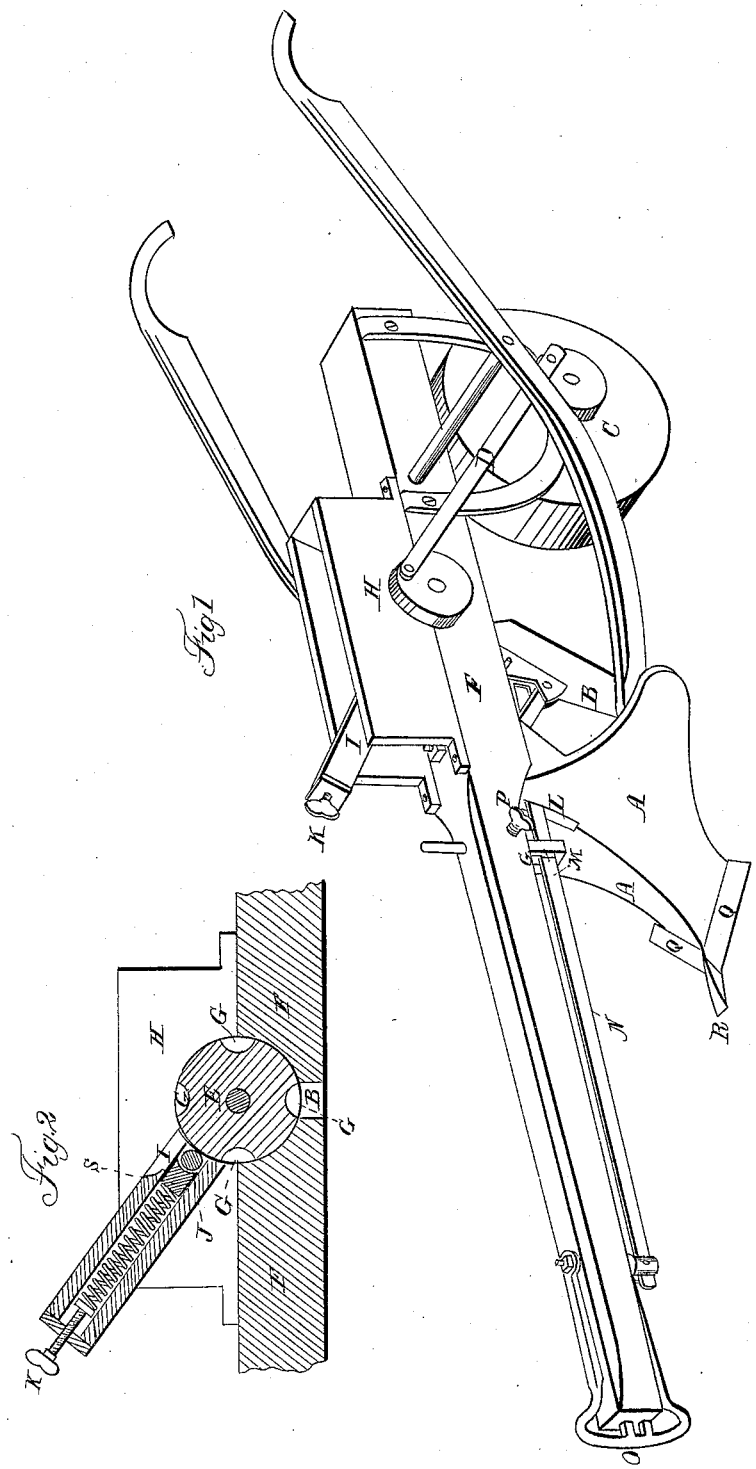

UNITED STATES PATENT OFFICE.

SAMUEL WITHEROW AND W. H. WITHEROW, OF GETTYSBURG, PENNSYLVANIA, ASSIGNORS TO SAMUEL WITHEROW.

IMPROVEMENT IN SEED-PLANTERS.

Specification forming part of Letters Patent No. 9,551, dated January 18, 1853.

*To all whom it may concern:*

Be it known that we, SAMUEL WITHEROW and WILLIAM H. WITHEROW, both of the borough of Gettysburg, in the county of Adams and State of Pennsylvania, have invented certain new and useful Improvements in Machines for Planting Corn, Cotton, Beans, Peas, &c.; and we do hereby declare the following to be a full, clear, and exact description of the same, reference being had to the accompanying drawings, making a part thereof, in which—

Figure 1 represents a perspective view of the planter complete. Fig. 2 represents a vertical section through the hopper, cylinder, and gage-slide with its spring for adjustment.

Similar letters in both the figures represent the same parts.

The nature of the first part of our invention consists in so arranging the spring gage-slide for preventing the breaking of the grains when accidentally received in the cells of the revolving seeding-cylinder edgewise as that the bulk of the grain in the hopper, which is constantly varying in quantity and weight, shall not rest on or influence said gage-slide, and so that the spring may be adjusted to any required pressure, whether the hopper be full or otherwise; and, secondly, the manner of adjusting the seeding-tube and supporting the drag-bar to which it is attached by passing the same through a slot in the neck of the mold-board.

To enable others skilled in the art to make and use our invention, we will proceed to describe the same with reference to the drawings.

The great practical difficulty in the drills heretofore constructed and in use has been that the shape of the grains of corn, &c., is such that two grains will get endwise or edgewise in the seed-cells, which will take in but one grain on its side, and when the fore end of the hopper is rigid and immovable, the grains thus situated must be cut or broken to pieces, and thus rendered worthless for planting. The holes or cells must be limited in size, otherwise a great waste of grain must be the result in planting. Various methods to obviate this difficulty have been devised, but none of which have effectually overcome it. The brush in removing the seed which projects from the cells removes also the seed which it is desired to plant, and thus makes false planting. The spring-gage heretofore used is arranged in the bottom of the hopper, and cannot be relied on, as it bears an ever changing quantity of grain upon it, and consequently a continually-varying pressure on the grain passing out of the hopper, and cannot be adjusted without emptying the hopper, so much so that when the spring-gage is set for yielding to a hopper half full it will not yield at all to a full hopper, and consequently fails to produce the desired effect. In our machine the grain does not rest on the spring-gage at all, and it is at all times, whether the hopper be full or otherwise, susceptible of the most accurate adjustment.

The mold-board A is double, and has a share adapted to it accordingly, dividing the furrow and throwing the earth equally on both sides of the mold-board. The share has also two wings, Q, to correspond with the mold-board, with the point R in the center thereof.

The mold-board, share, wings, and point may be constructed in any suitable manner or form, and of any size required.

The corn or other grain to be planted is conveyed to the furrow in the ground, immediately behind the mold-board, through a tube, B. This is followed by a roller, C, which is connected to the beam by two semicircular irons, through which the gudgeons of the roller upon which it revolves extend. The progress of the planter puts the roller C in motion, and which in turn operates the seeding-cylinder E by means of the cranks D, there being one on each side of the planter, or by any other well-known means of gearing.

The seeding-cylinder E may be of any suitable size, and is let into the beam F about one-half of its diameter. There are circular holes or cells G in said cylinder to take in the corn or other grain, and which may be made adjustable in size by the usual method of inserting a screw, which can be raised or lowered at pleasure, and as the cylinder revolves it conveys the grain from the hopper H down into the tube B, and from thence it passes into the ground. These cells may be such in number as to drop the grain at any desired intervals. The hopper H is so placed above the the cylinder E as to fit closely upon it, leaving the aperture where the corn rests upon the cylinder but a little more than the diameter of the cells in width, and in length sufficient to insure the dropping of the grain into the cells before they pass under the spring-gage.

In the fore end of the hopper (provided the seeding-cylinder rotates in the direction of the front of the machine) we insert a box or tube, I, at a suitable angle with the hopper and so that its lower end approaches close to the cylinder E at the place of exit of the corn or other grain. In the lower end of this box or tube we arrange a roller, J, of sufficient size to work freely inside of said box, and the bearings upon which it turns resting in a block, S, which slides up and down as it is operated upon by the roller below or the spring T above it, which is also inclosed in the box I. Through the top of the box passes a set-screw, K, the end of which is supplied with a button for pressing against the upper end of the spiral spring, and by which any adjustment or pressure may be had upon the roller J. When the grains come in contact with the roller J the spring allows it to rise and the grain to pass down, and the roller immediately closes down without injury to the grain, the lower end of the hopper next the grain being slightly cut away to allow the grain to come up fairly against the roller, and when the grain presses against the roller it also rotates upon its axis to relieve it. If the grains are flatwise in the cells, they do not touch the roller.

The drag-bar N is attached by one of its ends to the clevis-bolt and passes through an opening, a, in the adjustable hanger M, which passes up through the beam, and may be raised or lowered at pleasure for adjusting the seeding-tube B and held firmly when adjusted by the set-screw P. Through the neck of the mold-board is cut a slot, L, through which the drag-bar N also passes, and which gives it lateral strength and support, and to the rear end of the bar N is secured the seeding-tube B in any well-known manner, to prevent it from breaking when any obstacle presents itself to it.

The advantages of our invention consist in economizing time, labor, and seed; in putting one, two, or any suitable number of grains in a hill; in putting the grain in the ground uninjured and at any required depth, thus saving in seed, avoiding replanting, and enhancing the yield greatly over that done by ordinary planting.

The spring may also be applied and adapted to a circular horizontal plate containing drop-holes and placed at the bottom of the hopper in place of the cylinder.

Having thus fully described the nature of our invention, what we claim therein as new, and desire to secure by Letters Patent, is—

1. The arranging of the spring T, slide S, and roller J within a box or tube forming one end of the hopper in such a manner as to prevent any more seed from leaving the hopper than is required for planting, the whole being arranged in the manner and for the purpose specially set forth.

2. The arrangement of the drag-bar under the plow-beam and passing through the adjustable hanger M and a slot in the neck of the mold-board for the purpose of giving additional lateral support to it and protecting it from the earth which runs upon the mold-board in turning the furrow, the whole being arranged and combined in the manner and for the purpose herein set forth and described.

SAMUEL WITHEROW.
W. H. WITHEROW.

Witnesses:
D. McCONAUGHY,
W. A. McGINLEY.